Feb. 27, 1934.    P. T. ROBIN    1,948,677

TRAILER HITCH MECHANISM

Filed June 9, 1930

INVENTOR.
Philip T. Robin
BY
ATTORNEYS.

Patented Feb. 27, 1934

1,948,677

UNITED STATES PATENT OFFICE 1,948,677

TRAILER HITCH MECHANISM

Philip T. Robin, Erie, Pa., assignor, by mesne assignments, to The Wellman Engineering Company, Cleveland, Ohio, a corporation of Ohio Application June 9, 1930. Serial No. 460,033

1 Claim. (Cl. 280—33.1)

Some trailers are supplied with wheels at their rear ends and with means at their front ends for attachment and support on a truck, or vehicle. The present invention is designed to improve the hitch between the trailer and the truck. Features and details of the invention will appear from the specification and claim.

A preferred embodiment of the invention is illustrated in the accompanying drawing as follows:—

Figure 1:
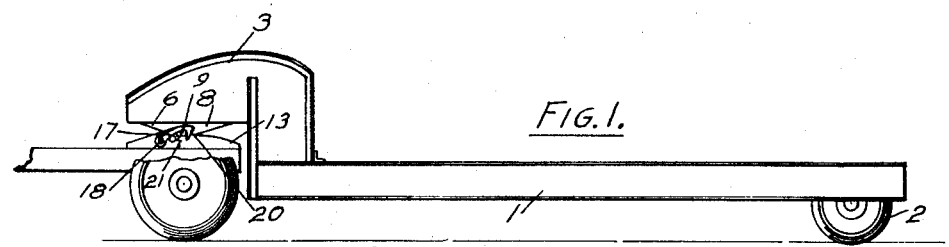

Fig. 1 shows a side elevation of a trailer in place.

Figure 2:
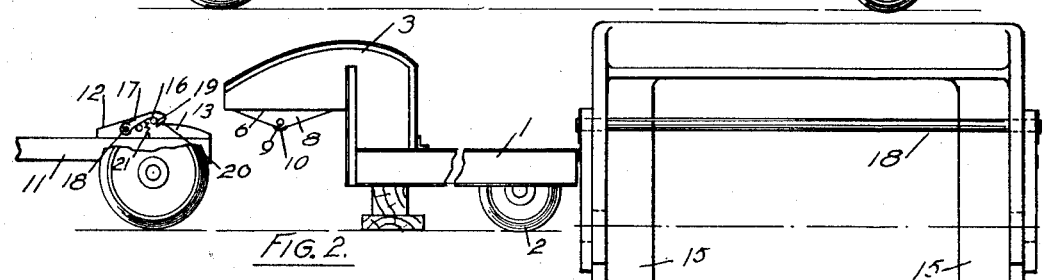

Fig. 2 a side elevation of the trailer detached and in position for attachment.

Figure 3:
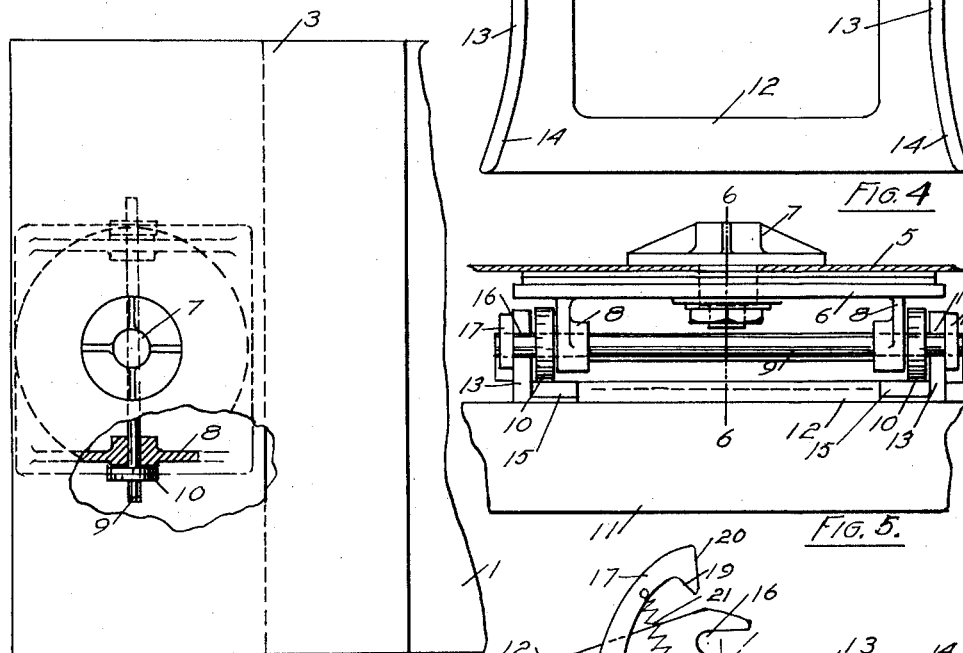

Fig. 3 an enlarged top view of the nose of the trailer.

Figure 4:
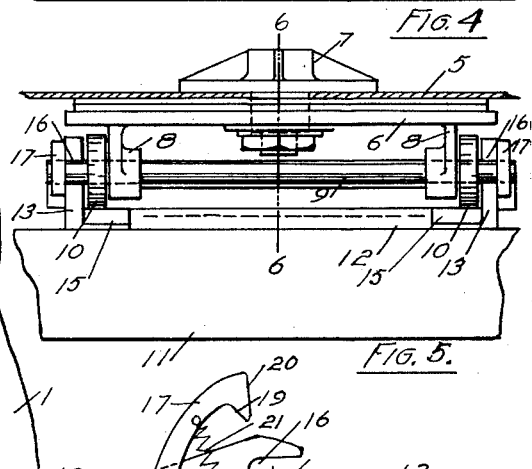

Fig. 4 an enlarged top view of the latch plate which is arranged on the truck.

Figure 5:
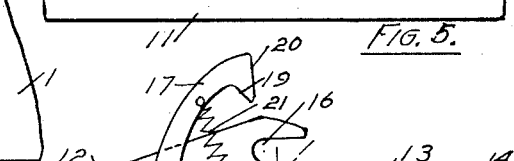

Fig. 5 a front view of the attaching mechanism.

Figure 6:
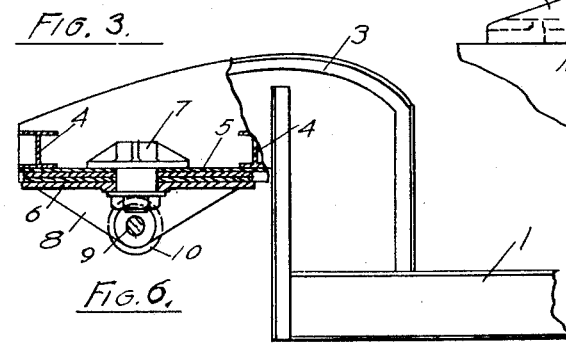

Fig. 6 a section on the line 6—6 in Fig. 5.

Figure 7:
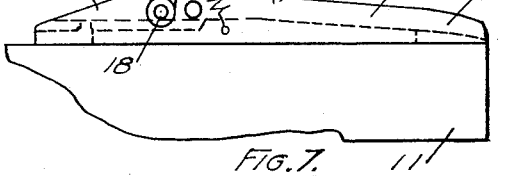

Fig. 7 a side elevation of the latch plate with the latch in open position.

1 marks the trailer body, 2 the trailer wheels and 3 the trailer nose.

The trailer nose is provided with cross bars 4 under which a supporting plate 5 is secured. The swivel bar, or fifth wheel 6 is secured on the plate 5 by a king pin, or bolt 7. The swivel bar 6 has downwardly extending ears 8 and a locking bar 9 is mounted in these ears, the ends of the bars extending outwardly from the ears. Rollers 10 are arranged on the locking bar 9 just outside of the ears 8.

A truck body 11 carries a latch plate 12. This latch plate has guide flanges 13 which flare at the rear ends 14 so as to facilitate the entry of the wheels 10. Tracks 15 are also provided on the latch plate on which the wheels travel. The guide flanges 13 terminate in a locking bar socket 16 which opens toward the rear and is adapted to receive the locking bar 9 as the truck is backed under the nose and the wheels 10 ride up the track 15. Latches 17 are arranged at each side of the latch plate and are fixed on a latch bar 18 pivoted in the latch plate. The latch plate has locking hooks 19 which are adapted to engage the locking bar when it is in place in the socket 16. The end of the latch has the inclined, or cam surface 20 so that it is automatically opened as the locking bar enters the socket. Springs 21 yieldingly draw the latches downwardly into locking position.

In the operation of the device the trailer in its fixed, or stationary position has its front end supported on blocks 22. The truck is backed under the nose, the rollers 10 engaging between the flanges 13 and riding up the track 15 so as to carry the locking bar into the socket 16. The latches 17 are automatically lifted and engage and lock the locking bar. When it is desired to release the truck the latch at either side of the latch bar is raised and this brings the companion latch at the opposite side so as to disengage the locking bar at both sides of the latch plate.

What I claim as new is:—

In a trailer mechanism, the combination of a trailer platform; a nose on the platform; a locking bar swiveled on the nose; rollers on the locking bar; a truck; a catch plate on the truck having guides, receiving sockets for the bar, and tracks for the rollers; and latches locking the bar in the sockets.

PHILIP T. ROBIN.